US012552601B2

(12) United States Patent
Mahan et al.

(10) Patent No.: US 12,552,601 B2
(45) Date of Patent: Feb. 17, 2026

(54) REFUSE CAN DETECTION SYSTEMS AND METHODS

(71) Applicant: Oshkosh Corporation, Oshkosh, WI (US)

(72) Inventors: Dakota Mahan, Oshkosh, WI (US); Christopher J. Rukas, Oshkosh, WI (US); John Beck, Oshkosh, WI (US); Brendan Chan, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 152 days.

(21) Appl. No.: 17/189,740

(22) Filed: Mar. 2, 2021

(65) Prior Publication Data

US 2021/0292086 A1 Sep. 23, 2021

Related U.S. Application Data

(60) Provisional application No. 62/985,027, filed on Mar. 4, 2020.

(51) Int. Cl.
*B65F 3/08* (2006.01)
*B60W 30/08* (2012.01)
(Continued)

(52) U.S. Cl.
CPC .............. *B65F 3/08* (2013.01); *B60W 30/08* (2013.01); *B60W 50/14* (2013.01); *B65F 3/02* (2013.01);
(Continued)

(58) Field of Classification Search
CPC ........ B65F 3/08; B65F 3/02; B65F 2003/023; G06V 40/10; G06V 20/56; G06F 18/2431;
(Continued)

(56) References Cited

U.S. PATENT DOCUMENTS 5,837,945 A * 11/1998 Cornwell ............. G01G 19/083
177/25.14
5,919,027 A 7/1999 Christenson
(Continued)

FOREIGN PATENT DOCUMENTS

CH 703732 A2 * 3/2012 ............ B65F 1/1447

OTHER PUBLICATIONS

Pang et al, "Efficient Featurized Image Pyramid Network for Single Shot Detector", 2019, IEEE, 2019 IEEE/CVF Conference on Computer Vision and Pattern Recognition (CVPR), whole document (Year: 2019).*
(Continued)

*Primary Examiner* — Kenneth M Dunne
(74) *Attorney, Agent, or Firm* — Foley & Lardner LLP

(57) ABSTRACT

A system for detecting and engaging a refuse can includes at least one sensor coupled to a refuse collection vehicle and configured to detect objects on one or more sides of the refuse vehicle, an actuator assembly coupled to the refuse collection vehicle and configured to actuate to engage the refuse can, and a controller configured to receive first data from the at least one sensor, input the first data to a single-stage object detector, identify, based on an output of the single-stage object detector, the refuse can, and initiate a control action to move the actuator assembly and the refuse collection vehicle to engage the refuse can.

22 Claims, 11 Drawing Sheets

(51) Int. Cl.
  *B60W 50/14* (2020.01)
  *B65F 3/02* (2006.01)
  *G06F 18/2431* (2023.01)
  *G06V 20/56* (2022.01)
  *G06V 40/10* (2022.01)

(52) U.S. Cl.
  CPC .......... *G06F 18/2431* (2023.01); *G06V 20/56* (2022.01); *G06V 40/10* (2022.01); *B60W 2050/143* (2013.01); *B65F 2003/023* (2013.01)

(58) Field of Classification Search
  CPC . B60W 30/08; B60W 50/14; B60W 2050/143
  See application file for complete search history.

(56) References Cited

U.S. PATENT DOCUMENTS

| | | |
|---|---|---|
| 5,934,858 A | 8/1999 | Christenson |
| 5,934,867 A | 8/1999 | Christenson |
| 5,938,394 A | 8/1999 | Christenson |
| 5,951,235 A | 9/1999 | Young et al. |
| 5,967,731 A | 10/1999 | Brandt |
| 5,984,609 A | 11/1999 | Bartlett |
| 6,033,176 A | 3/2000 | Bartlett |
| 6,062,803 A | 5/2000 | Christenson |
| 6,089,813 A | 7/2000 | Mcneilus et al. |
| 6,120,235 A | 9/2000 | Humphries et al. |
| 6,123,500 A | 9/2000 | Mcneilus et al. |
| 6,210,094 B1 | 4/2001 | Mcneilus et al. |
| 6,213,706 B1 | 4/2001 | Christenson |
| 6,224,318 B1 | 5/2001 | Mcneilus et al. |
| 6,315,515 B1 | 11/2001 | Young et al. |
| 6,336,783 B1 | 1/2002 | Young et al. |
| 6,350,098 B1 | 2/2002 | Christenson et al. |
| 6,447,239 B2 | 9/2002 | Young et al. |
| 6,474,928 B1 | 11/2002 | Christenson |
| 6,565,305 B2 | 5/2003 | Schrafel |
| 7,070,382 B2 | 7/2006 | Pruteanu et al. |
| 7,284,943 B2 | 10/2007 | Pruteanu et al. |
| 7,556,468 B2 | 7/2009 | Grata |
| 7,559,735 B2 | 7/2009 | Pruteanu et al. |
| 7,878,750 B2 | 2/2011 | Zhou et al. |
| 8,182,194 B2 | 5/2012 | Pruteanu et al. |
| 8,215,892 B2 | 7/2012 | Calliari |
| 8,360,706 B2 | 1/2013 | Addleman et al. |
| 8,540,475 B2 | 9/2013 | Kuriakose et al. |
| 8,807,613 B2 | 8/2014 | Howell et al. |
| 9,216,856 B2 | 12/2015 | Howell et al. |
| 9,387,985 B2 | 7/2016 | Gillmore et al. |
| 9,880,581 B2 | 1/2018 | Kuriakose et al. |
| 9,981,803 B2 | 5/2018 | Davis et al. |
| 10,196,205 B2 | 2/2019 | Betz et al. |
| 10,457,533 B2 | 10/2019 | Puszkiewicz et al. |
| 10,558,234 B2 | 2/2020 | Kuriakose et al. |
| 10,781,090 B2 | 9/2020 | Puszkiewicz et al. |
| 10,800,605 B2 | 10/2020 | Rocholl et al. |
| 10,858,184 B2 | 12/2020 | Betz et al. |
| 10,859,167 B2 | 12/2020 | Jax et al. |
| 10,899,538 B2 | 1/2021 | Nelson et al. |
| 2018/0245316 A1* | 8/2018 | Forcash .................. E02F 1/00 |
| 2019/0130583 A1* | 5/2019 | Chen ...................... G06T 7/194 |
| 2019/0185077 A1 | 6/2019 | Smith et al. |
| 2019/0197498 A1* | 6/2019 | Gates ..................... H04N 7/181 |
| 2019/0225422 A1* | 7/2019 | Wrigley ................. B60Q 5/006 |
| 2020/0094408 A1* | 3/2020 | Yui ........................ B25J 9/1664 |
| 2020/0109963 A1* | 4/2020 | Zass ..................... G05D 1/0094 |
| 2020/0175384 A1* | 6/2020 | Zhang ................... G06N 3/088 |
| 2020/0247609 A1* | 8/2020 | Maroney ................. B65F 3/04 |
| 2020/0262328 A1 | 8/2020 | Nelson et al. |
| 2020/0342240 A1* | 10/2020 | Szoke-Sieswerda .... G06N 3/08 |
| 2020/0346854 A1 | 11/2020 | Rocholl et al. |
| 2020/0346855 A1 | 11/2020 | Rocholl et al. |
| 2020/0346856 A1 | 11/2020 | Rocholl et al. |
| 2020/0346857 A1 | 11/2020 | Rocholl et al. |
| 2020/0346858 A1 | 11/2020 | Buege et al. |
| 2020/0346859 A1 | 11/2020 | Buege et al. |
| 2020/0346860 A1 | 11/2020 | Buege et al. |
| 2020/0346861 A1 | 11/2020 | Rocholl et al. |
| 2020/0346862 A1 | 11/2020 | Rocholl et al. |
| 2020/0347659 A1 | 11/2020 | Rocholl et al. |
| 2020/0369468 A1* | 11/2020 | Searle ................... H04N 7/183 |
| 2020/0399057 A1 | 12/2020 | Rocholl et al. |
| 2021/0054942 A1 | 2/2021 | Jax et al. |
| 2021/0086991 A1 | 3/2021 | Betz et al. |
| 2021/0088036 A1 | 3/2021 | Schubart et al. |
| 2021/0139237 A1 | 5/2021 | Nelson et al. |
| 2021/0148083 A1* | 5/2021 | Taylor ................... E02F 9/2029 |

OTHER PUBLICATIONS

Anders Christiansen, "Anchor Boxes—The key to quality object detection", Oct. 2018, towardsdatascience.com. (Year: 2018).*
Machine translation of CH 703732 A2 (Year: 2012).*
Kaiming He, et al, Deep Residual Learning for Image Recognition, Proceedings of the IEEE Conference on Computer Vision and Pattern Recognition (CVPR), 2016, pp. 770-778.
Tsung-Yi Lin, et al, Feature Pyramid Networks for Object Detection, Proceedings of the IEEE Conference on Computer Vision and Pattern Recognition (CVPR), 2017, pp. 2117-2125.
Tsung-Yi Lin, et al, Focal Loss for Dense Object Detection; Proceedings of the IEEE International Conference on Computer Vision (ICCV), 2017, pp. 2980-2988.

* cited by examiner

REFUSE CAN DETECTION SYSTEMS AND METHODS

CROSS-REFERENCE TO RELATED PATENT APPLICATIONS

This application claims the benefit of U.S. Provisional Patent Application No. 62/985,027, filed Mar. 4, 2020, which is incorporated herein by reference in its entirety.

BACKGROUND

Refuse vehicles collect a wide variety of waste, trash, and other material from residences and businesses. Operators of the refuse vehicles transport the material from various waste receptacles within a municipality to a storage or processing facility (e.g., a landfill, an incineration facility, a recycling facility, etc.).

SUMMARY

One implementation of the present disclosure is a system for detecting and engaging a refuse can. The system includes at least one sensor coupled to a refuse collection vehicle and configured to detect objects on one or more sides of the refuse vehicle, an actuator assembly coupled to the refuse collection vehicle and configured to actuate to engage the refuse can, and a controller configured to receive first data from the at least one sensor, input the first data to a single-stage object detector, identify, based on an output of the single-stage object detector, the refuse can, and initiate a control action to move the actuator assembly and the refuse collection vehicle to engage the refuse can.

Another implementation of the present disclosure is a method for detecting a refuse can. The method includes receiving data from one or more sensors coupled to a refuse collection vehicle, processing the data by inputting the data into a single-stage object detector, identifying the refuse can based on an output of the single-stage object detector, determining a location of the refuse can, generating a trajectory for at least one of the refuse collection vehicle or an actuator assembly coupled to the refuse collection vehicle, and initiating a control action to move the at least one of the refuse collection vehicle or the actuator assembly to the refuse can.

Yet another implementation of the present disclosure is a controller for a refuse collection vehicle. The controller includes one or more memory devices having instructions stored thereon that, when executed by one or more processors, cause the one or more processors to perform operations including receiving data from one or more image sensors coupled to an exterior of the refuse collection vehicle, processing the data via a single-stage object detector to identify a refuse can, wherein an output of the single-stage object detector is a probability of a presence of the refuse can, generating a trajectory for at least one of the refuse collection vehicle or an actuator assembly coupled to the refuse collection vehicle to engage the refuse can, and initiating a control action to move the at least one of the refuse collection vehicle or the actuator assembly to the refuse can.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

The following description includes the best mode presently contemplated for practicing the described implementations. This description is not to be taken in a limiting sense, but rather is made merely for the purpose of describing the general principles of the implementations. The scope of the described implementations should be ascertained with reference to the issued claims.

Referring generally to the FIGURES, systems and methods for detecting a refuse can are shown, according to various embodiments. The refuse can detection systems may include a controller configured to receive and process data from a plurality of cameras and/or sensors coupled to a refuse vehicle. The refuse vehicle may be a garbage truck, a waste collection truck, a sanitation truck, etc., configured for side-loading, front-loading, or rear-loading. The plurality of cameras and/or sensors (e.g., LIDAR, radar, etc.) and the controller may be disposed in any suitable location on the refuse vehicle. The controller may process data from the cameras and/or sensors to detect the presence of refuse cans and/or human beings (e.g., or other objects), for example. The location of an identified refuse may be determined and used to navigate the refuse vehicle and/or an actuator assembly (e.g., a actuator assembly) of the refuse vehicle to engage the refuse can. As denoted herein, a refuse can may include any type of residential, commercial, or industrial refuse container.

Figure 1A:
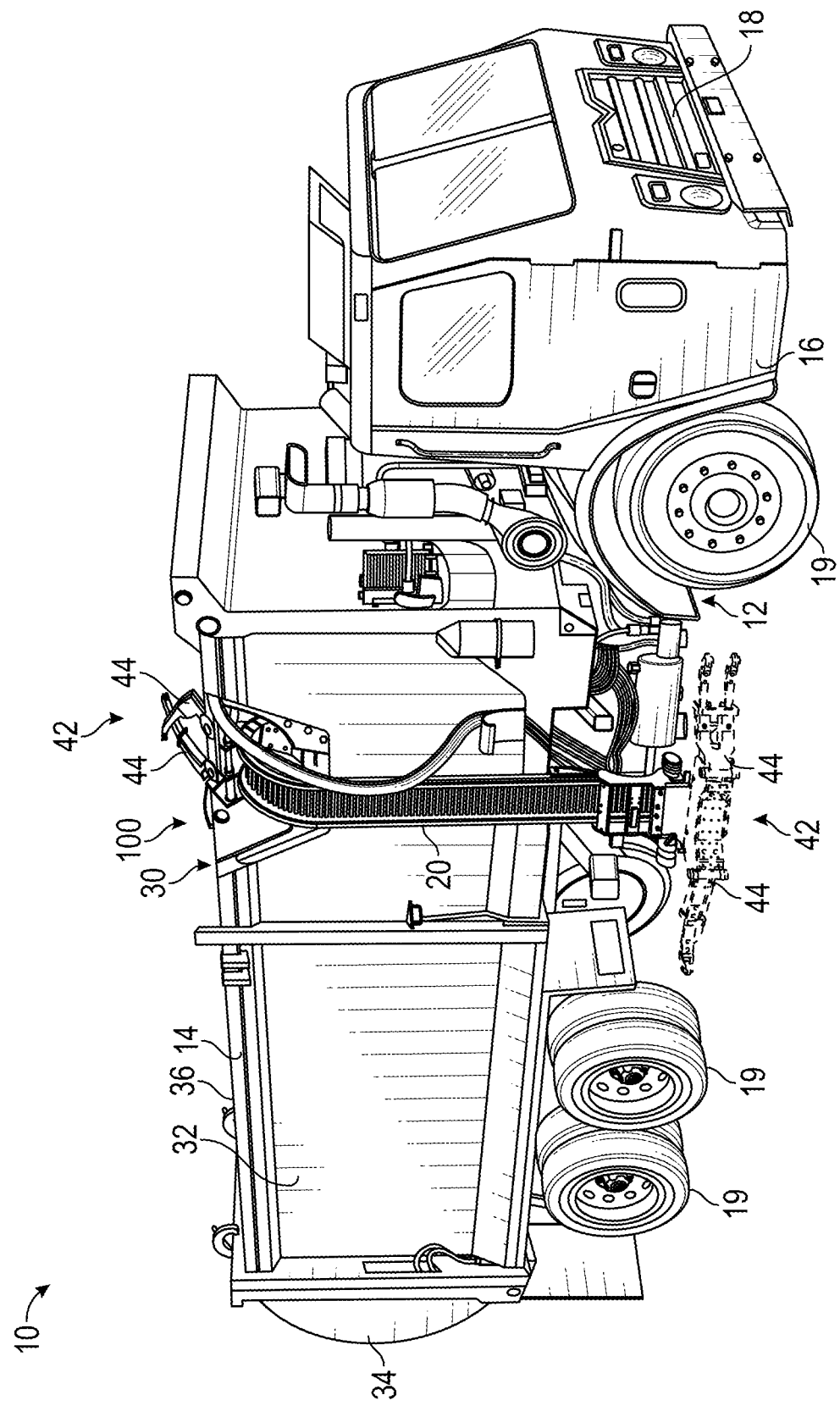
FIGS. 1A and 1B are perspective views of a refuse vehicle, according to some embodiments.
Figure 1B:
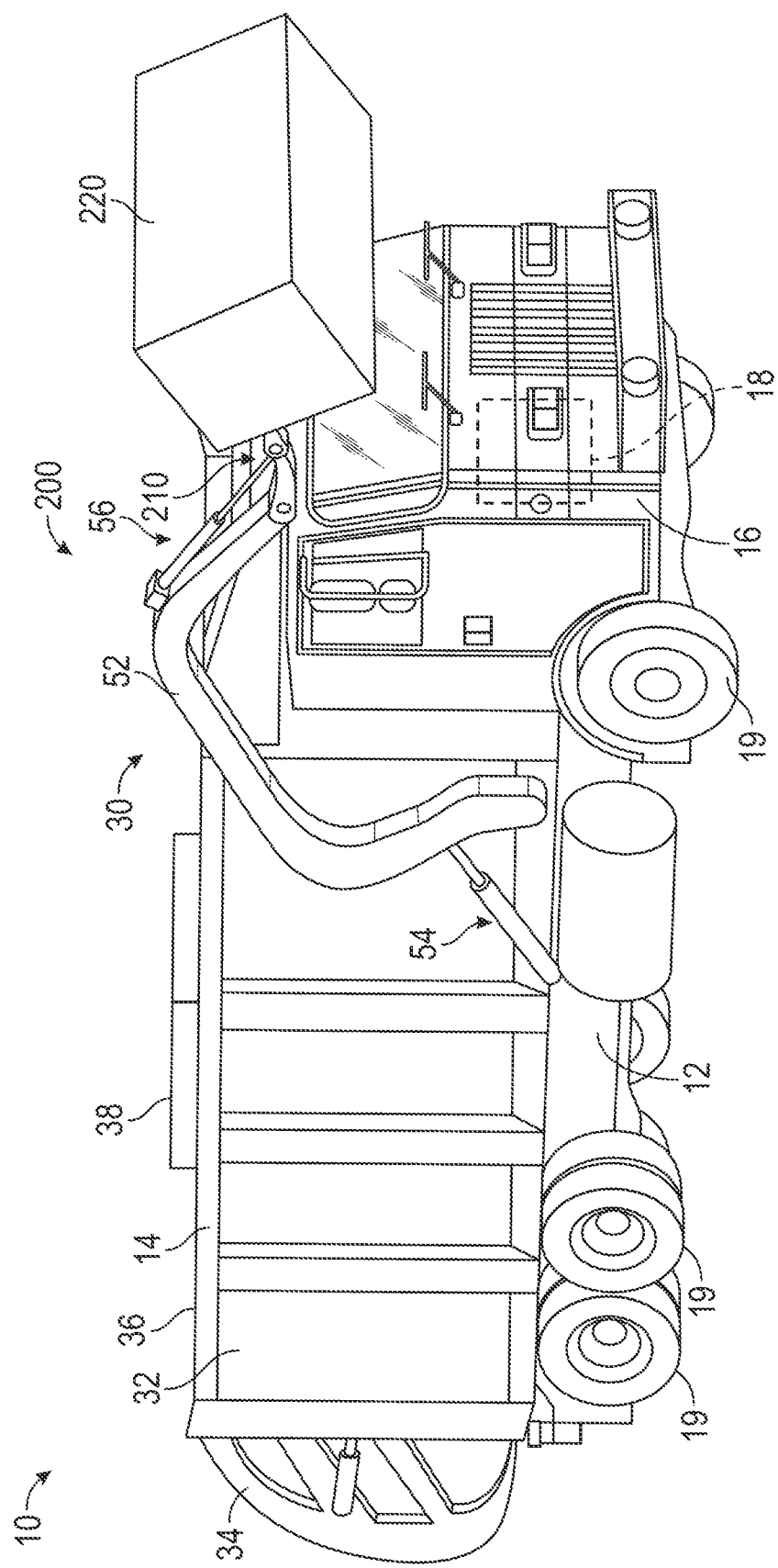

Referring now to FIGS. 1A and 1B, a refuse vehicle 10 is shown, according to some embodiments. Refuse vehicle 10 may be a garbage truck, a waste collection truck, a sanitation truck, etc., and may be configured as a side-loading refuse truck (e.g., as shown in FIG. 1A), front-loading refuse truck (e.g., as shown in FIG. 1B), or a rear-loading refuse truck. In other embodiments, refuse vehicle 10 is another type of vehicle (e.g., a skid-loader, a telehandler, a plow truck, a boom lift, etc.). As shown, refuse vehicle 10 includes a chassis, shown as frame 12; a body assembly, shown as body 14, coupled to the frame 12 (e.g., at a rear end thereof, etc.); and a cab, shown as cab 16, coupled to the frame 12 (e.g., at a front end thereof, etc.). The cab 16 may include various components to facilitate operation of the refuse vehicle 10 by an operator, such as a seat, a steering wheel, hydraulic controls, a graphical user interface (e.g., a touchscreen user interface), switches, buttons, dials, etc.

As shown, refuse vehicle 10 includes a prime mover, shown as engine 18, coupled to the frame 12 at a position beneath the cab 16. Engine 18 is configured to provide power to a series of tractive elements, shown as wheels 19, and/or to other systems of refuse vehicle 10 (e.g., a pneumatic system, a hydraulic system, etc.). Engine 18 may be configured to utilize one or more of a variety of fuels (e.g., gasoline, diesel, bio-diesel, ethanol, natural gas, etc.), according to various exemplary embodiments. According to an alternative embodiment, engine 18 additionally or alternatively includes one or more electric motors coupled to frame 12 (e.g., a hybrid refuse vehicle, an electric refuse vehicle, etc.). The electric motors may consume electrical power from an on-board storage device (e.g., batteries, ultracapacitors, etc.), from an on-board generator (e.g., an internal combustion engine, etc.), and/or from an external power source (e.g., overhead power lines, etc.) and provide power to the systems of refuse vehicle 10.

In some embodiments, refuse vehicle 10 is configured to transport refuse from various waste receptacles within a municipality to a storage and/or processing facility (e.g., a landfill, an incineration facility, a recycling facility, etc.). As shown, the body 14 includes a plurality of panels, shown as panels 32, a tailgate 34, and a cover 36. In some embodiments, as shown in FIG. 1B, body 14 further includes a door, shown as top door 38, which is movably coupled along cover 36 to seal the opening thereby preventing refuse from escaping the refuse compartment 30 (e.g., due to wind, bumps in the road, etc.). Panels 32, tailgate 34, cover 36, and/or top door 38 define a collection chamber (e.g., hopper, etc.), shown as refuse compartment 30. Loose refuse may be placed into refuse compartment 30 where it may thereafter be compacted. Refuse compartment 30 may provide temporary storage for refuse during transport to a waste disposal site and/or a recycling facility. In some embodiments, at least a portion of body 14 and refuse compartment 30 extend in front of cab 16. In some embodiments, body 14 and refuse compartment 30 are positioned behind cab 16.

In some embodiments, refuse compartment 30 includes a hopper volume and a storage volume. Refuse may be initially loaded into the hopper volume and thereafter compacted into the storage volume. According to an exemplary embodiment, the hopper volume is positioned between the storage volume and cab 16 (i.e., refuse is loaded into a position of refuse compartment 30 behind cab 16 and stored in a position further toward the rear of refuse compartment 30). In other embodiments, the storage volume is positioned between the hopper volume and cab 16 (e.g., a rear-loading refuse vehicle, etc.).

As shown in FIG. 1A, refuse vehicle 10, when configured as a side-loading refuse vehicle, may include a side-loading lift mechanism/system (i.e., a side-loading lift assembly), shown as lift assembly 100. Lift assembly 100 includes a grabber assembly, shown as grabber assembly 42, slidably coupled to a guide, shown as track 20, and configured to move along an entire length of the track 20. Track 20 is shown to extend along substantially an entire height of the body 14 and is configured to cause the grabber assembly 42 to tilt or rotate near an upper height of the body 14. In other embodiments, the track 20 extends along substantially an entire height of the body 14 on a rear side of the body 14.

Figure 2A:
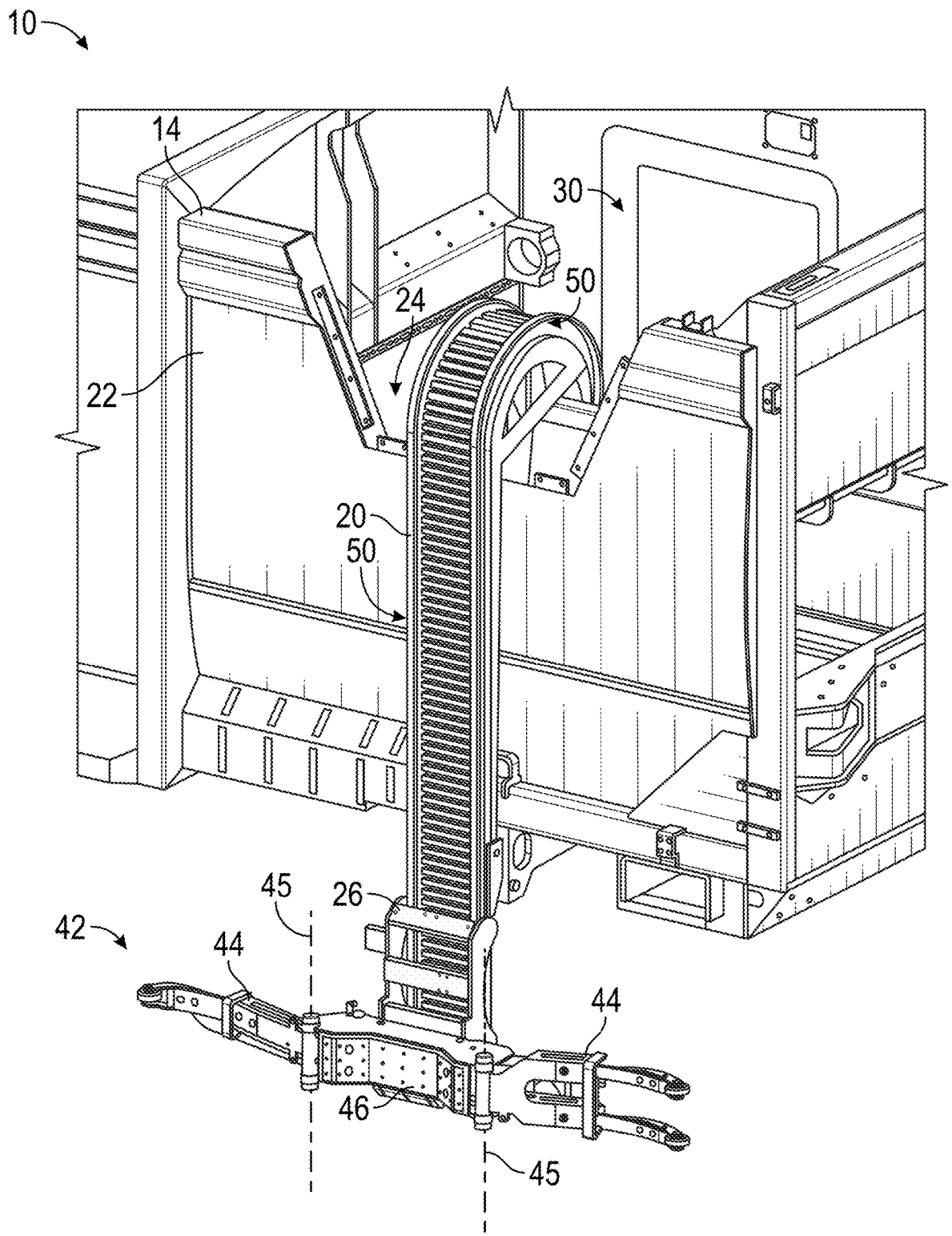
FIG. 2A is a perspective view of a first type of actuator assembly for use with the refuse vehicle of FIGS. 1A and 1B, according to some embodiments.

Grabber assembly 42 is shown to include a pair of actuators, shown as actuators 44. Actuators 44 are configured to releasably secure a refuse container to grabber assembly 42, according to an exemplary embodiment. Actuators 44 are selectively repositionable (e.g., individually, simultaneously, etc.) between an engaged position or state and a disengaged position or state. In the engaged position, actuators 44 are rotated towards one other such that the refuse container may be grasped therebetween. In the disengaged position, actuators 44 rotate outwards (e.g., as shown in FIG. 2A) such that the refuse container is not grasped by actuators 44. By transitioning between the engaged position and the disengaged position, actuators 44 releasably couple the refuse container to grabber assembly 42.

In operation, the refuse vehicle 10 may pull up alongside the refuse container, such that the refuse container is positioned to be grasped by the grabber assembly 42 therein. The grabber assembly 42 may then transition into an engaged state to grasp the refuse container. After the refuse container has been securely grasped, the grabber assembly 42 may be transported along the track 20 (e.g., by an actuator) with the refuse container. When the grabber assembly 42 reaches the end of track 20, grabber assembly 42 may tilt and empty the contents of the refuse container into the refuse compartment 30. The tilting is facilitated by the path of track 20. When the contents of the refuse container have been emptied into refuse compartment 30, the grabber assembly 42 may descend along track 20 and return the refuse container to the ground. Once the refuse container has been placed on the ground, the grabber assembly 42 may transition into the disengaged state, releasing the refuse container.

As shown in FIG. 1B, refuse vehicle 10, when configured as a front-loading refuse vehicle, may include side-loading lift mechanism/system (i.e., a front-loading lift assembly), shown as lift assembly 200. Lift assembly 200 includes a pair of arms, shown as lift arms 52, coupled to the frame 12 and/or the body 14 on either side of the refuse vehicle 10 such that the lift arms 52 extend forward of the cab 16 (e.g., a front-loading refuse vehicle, etc.). In other embodiments, the lift assembly 200 extends rearward of the body 14 (e.g., a rear-loading refuse vehicle, etc.). In still other embodiments, the lift assembly 200 extends from a side of the body 14 (e.g., a side-loading refuse vehicle, etc.). The lift arms 52 may be rotatably coupled to frame 12 with a pivot (e.g., a lug, a shaft, etc.). As shown, the lift assembly 200 includes first actuators, shown as lift arm actuators 54 (e.g., hydraulic cylinders, etc.), coupled to the frame 12 and the lift arms 52. The lift arm actuators 54 are positioned such that extension and retraction thereof rotates the lift arms 52 about an axis extending through the pivot, according to an exemplary embodiment.

An attachment assembly 210 may be coupled to the lift arms 52 of the lift assembly 200. As shown, the attachment assembly 210 is configured to engage with a first attachment, shown as container attachment 220, to selectively and releasably secure the container attachment 220 to the lift assembly 200. In some embodiments, attachment assembly 210 may be configured to engage with a second attachment, such as a fork attachment, to selectively and releasably secure second attachment to the lift assembly 200. In various embodiments, attachment assembly 210 may be configured to engage with another type of attachment (e.g., a street sweeper attachment, a snow plow attachment, a snowblower attachment, a towing attachment, a wood chipper attachment, a bucket attachment, a cart tipper attachment, a grabber attachment, etc.).

As shown in FIG. 1B, the lift arms 52 are rotated by the lift arm actuators 54 to lift the container attachment 220 or other attachment over the cab 16. Lift assembly 200 includes second actuators, shown as articulation actuators 56 (e.g., hydraulic cylinders, etc.). In some embodiments, the articulation actuators 56 are positioned to articulate the attachment assembly 210. Such articulation may assist in tipping refuse out of the container attachment 220 and/or a refuse container (e.g., coupled to the lift assembly 200 by a fork attachment, etc.) and into the hopper volume of the refuse compartment 30 through an opening in the cover 36. The lift arm actuators 54 may thereafter rotate the lift arms 52 to return the empty container attachment 220 to the ground. In some embodiments, top door 38 is movably coupled along the cover 36 to seal the opening thereby preventing refuse from escaping the refuse compartment 30 (e.g., due to wind, bumps in the road, etc.).

Figure 2B:
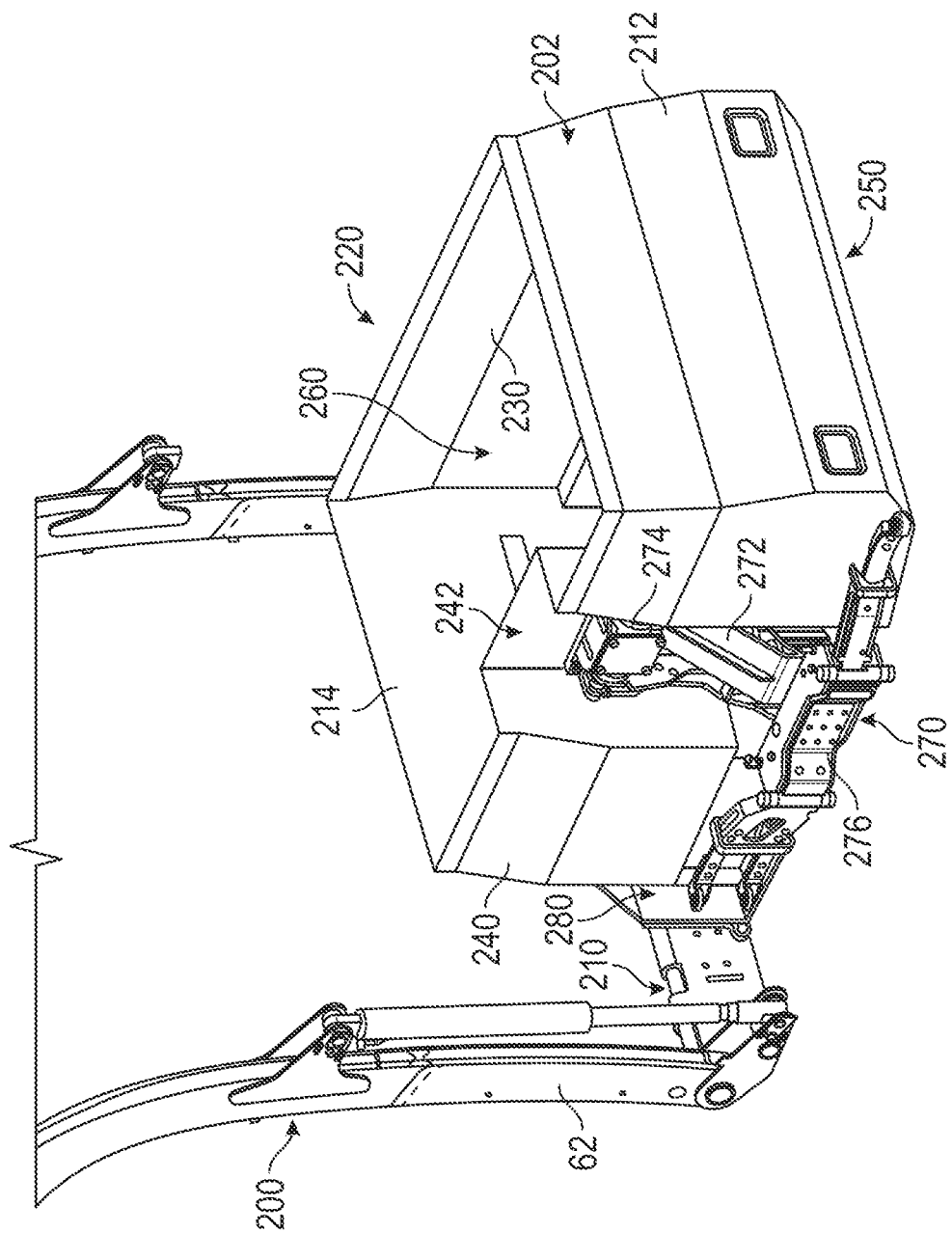
FIG. 2B is a perspective view of a second type of actuator assembly for use with the refuse vehicle of FIGS. 1A and 1B, according to some embodiments.

Referring now to FIGS. 2A and 2B, detailed perspective views of lift assemblies for use with refuse truck 10 are shown, according to some embodiments. Specifically, FIG. 2A shows a detailed, perspective view of lift assembly 100, according to some embodiments. As described briefly above, lift assembly 100 includes track 20 and grabber assembly 42, which includes a frame, chassis, or connecting member, shown as carriage 26. The track 20 extends along substantially the entire height of the body 14, according to the exemplary embodiment shown. The body 14 includes a panel, shown as loading section 22, that defines a cutout or notch, shown as recess 24, through which the track 20 passes. The recess 24 facilitates a curved portion of the track 20 extending around the top of the loading section 22 without increasing the overall height of the vehicle 10. When the grabber assembly 42 moves along the curved portion of the track 20, the grabber assembly 42 is inverted to empty the refuse container releasably coupled to the grabber assembly 42 into the refuse compartment 30.

The carriage 26 is slidably coupled to the track 20. In operation, the carriage 26 may translate along a portion or all of the length of the track 20. The carriage 26 is removably coupled (e.g., by removable fasteners) to a body or frame of the grabber assembly 42, shown as grabber frame 46. Alternatively, the grabber frame 46 may be fixedly coupled to (e.g., welded to, integrally formed with, etc.) the carriage 26. The actuators 44 are each pivotally coupled to the grabber frame 46 such that they rotate about a pair of axes 45. The axes 45 extend substantially parallel to one another and are longitudinally offset from one another. In some embodiments, one or more actuators configured to rotate the actuators 44 between the engaged state and the disengaged state are coupled to the grabber frame 46 and/or the carriage 26.

Referring now to FIG. 2B, a detailed, perspective view of lift assembly 200 is shown, according to some embodiments. As shown, container attachment 220 includes a container, shown as refuse container 202; an articulating refuse collection arm, shown as collection arm assembly 270; and an interface, shown as attachment interface 280. The refuse container 202 has a first wall, shown as front wall 212; an opposing second wall, shown as rear wall 214 (e.g., positioned between the cab 16 and the front wall 212, etc.); a first sidewall, shown as first sidewall 230; an opposing second sidewall, shown as second sidewall 240; and a bottom surface, shown as bottom 250. The front wall 212, the rear wall 214, the first sidewall 230, the second sidewall 240, and the bottom 250 cooperatively define an internal cavity, shown as container refuse compartment 260. According to an exemplary embodiment, the container refuse compartment 260 is configured to receive refuse from a refuse container (e.g., a residential garbage can, a recycling bin, etc.).

As shown, the second sidewall 240 of the refuse container 202 defines a cavity, shown as recess 242. The collection arm assembly 270 is coupled to the refuse container 202 and may be positioned within the recess 242. In other embodiments, the collection arm assembly 270 is otherwise positioned (e.g., coupled to the rear wall 214, coupled to the first sidewall 230, coupled to the front wall 212, etc.). According to an exemplary embodiment, the collection arm assembly 270 includes an arm, shown as arm 272; a grabber assembly, shown as grabber 276, coupled to an end of the arm 272; and an actuator, shown as actuator 274. The actuator 274 may be positioned to selectively reorient the arm 272 such that the grabber 276 is extended laterally outward from and retracted laterally inward toward the refuse container 202 to engage (e.g., pick up, etc.) a refuse container (e.g., a garbage can, a reclining bin, etc.) for emptying refuse into the container refuse compartment 260.

Figure 3A:
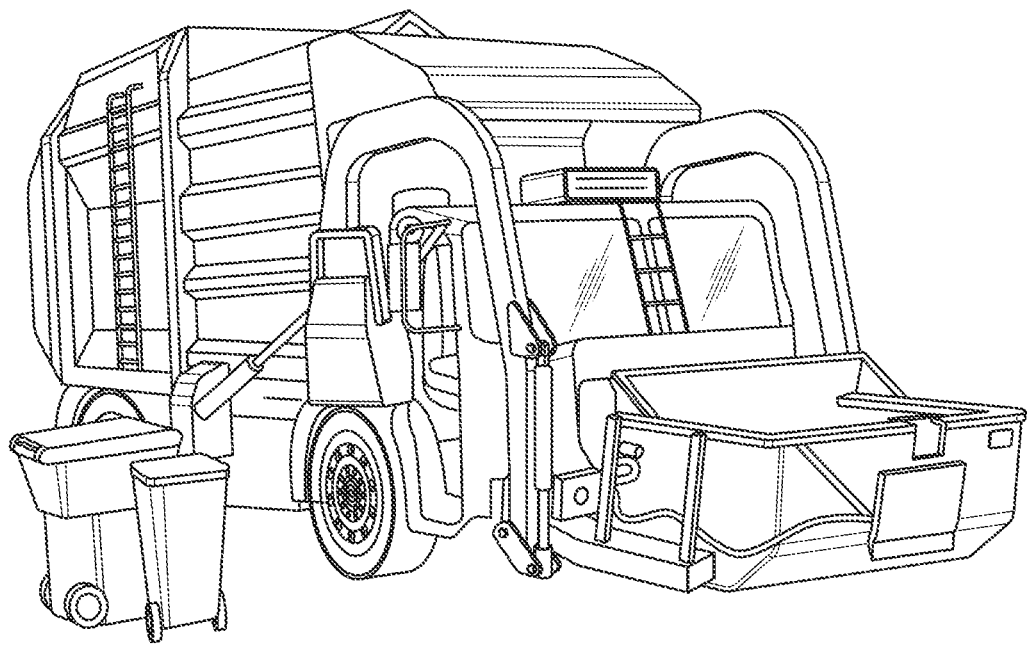
FIGS. 3A-3C are examples configurations of the refuse truck of FIGS. 1A and 1B, according to some embodiments.
Figure 3B:
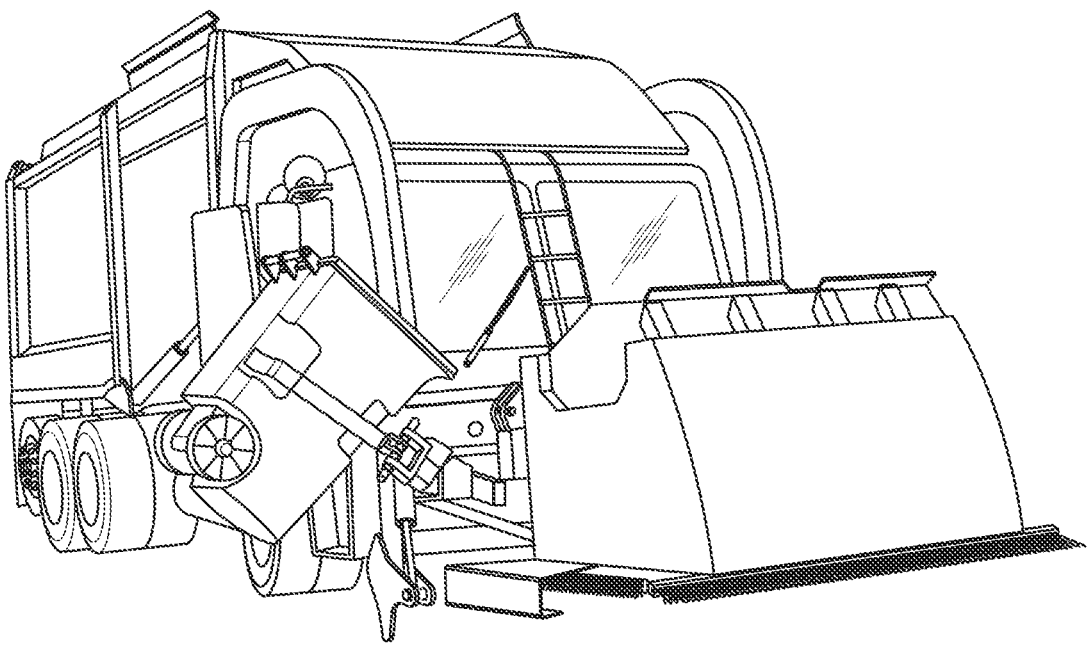
Figure 3C:
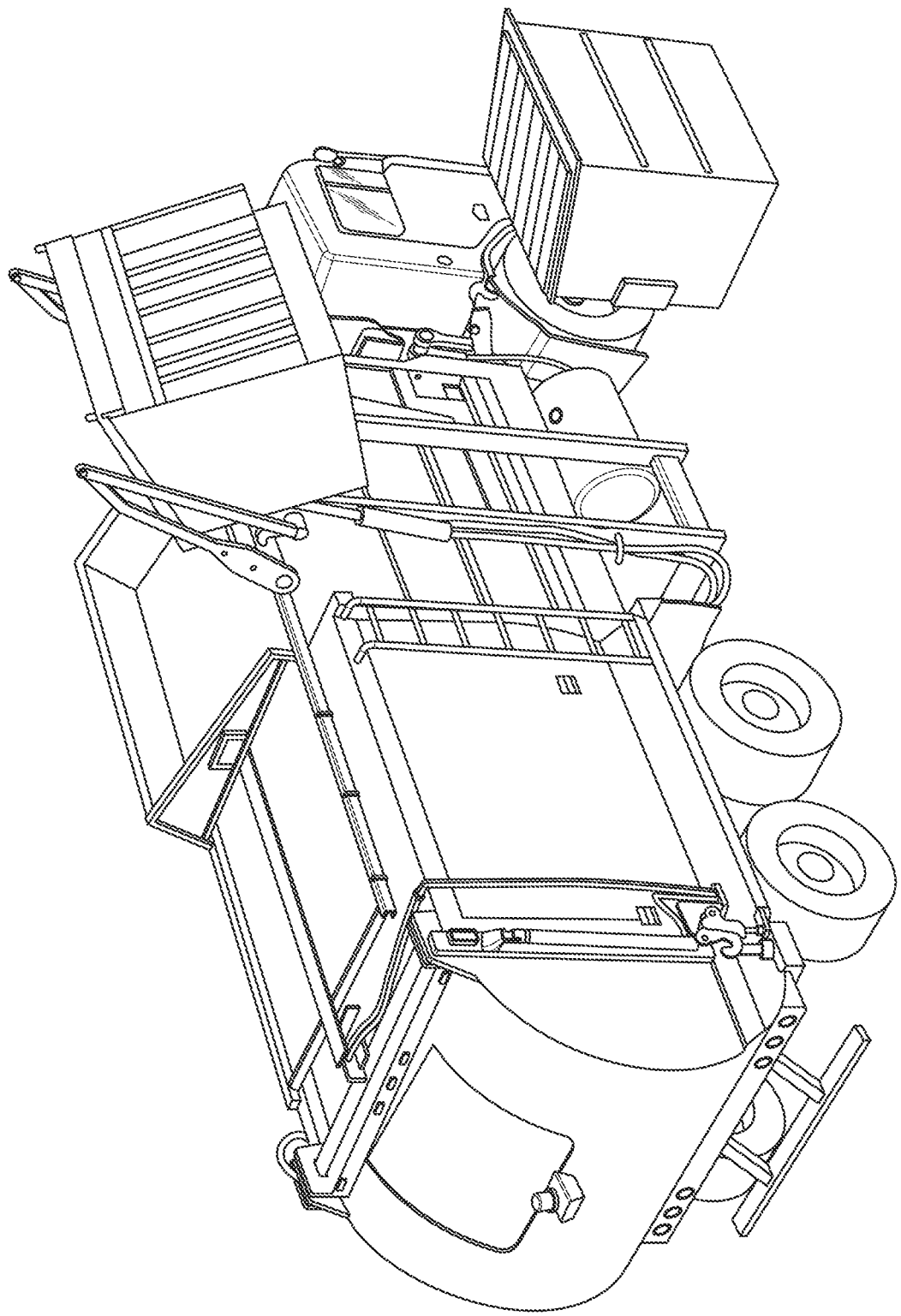

Referring now to FIGS. 3A-3C, example configurations of refuse truck 10 are shown, according to some embodiments. FIGS. 3A-3C may illustrate examples of potential configurations of refuse vehicle 10 in addition to the configurations described above with respect to FIGS. 1A-1B and 2A-2B. Specifically, FIG. 3A illustrates a front-loading configuration of refuse vehicle 10 with an intermediate storage container. FIG. 3B illustrates another front-loading configuration of refuse vehicle 10 with an intermediate storage container that includes an actuator assembly (e.g., similar to container attachment 220). FIG. 3C illustrates a side-loading configuration of refuse vehicle 10 (e.g., an auto side-loader) with a grabber-tipper assembly configured to engage an industrial or commercial refuse container. It will be appreciated that the configurations shown in FIGS. 3A-3C illustrate example configurations of refuse vehicle 10 and are not intended to be limiting. As described above, refuse vehicle 10 may be configured in any number of front, side, and/or rear-loading configurations, with any type of lift and/or grabber assembly for engaging a commercial or residential refuse can.

Figure 4:
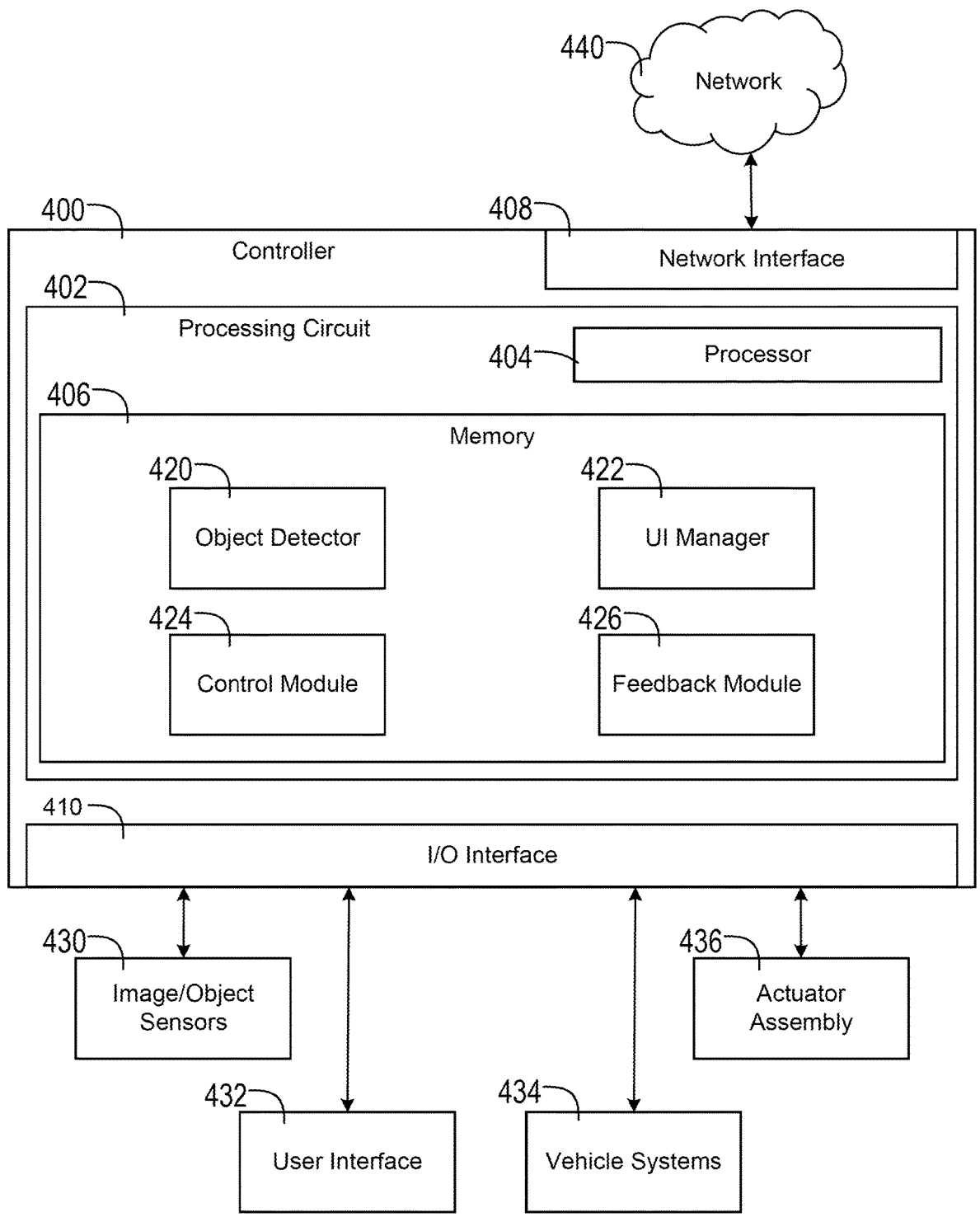
FIG. 4 a block diagram of a controller for use with a refuse vehicle, according to some embodiments.

Referring now to FIG. 4, a controller 400 for refuse vehicle 10 is shown, according to some embodiments. Controller 400 may be configured to receive data from image and/or object sensors (i.e., cameras and sensors) to detect and/or track a plurality of refuse can located on any side of a refuse vehicle (e.g., the front, sides, or rear of refuse vehicle 10). Controller 400 may be further configured to initiate automated control actions based on the detection of a refuse can. It will be appreciated that controller 400 may be implemented via single controller or may be implemented across multiple controllers or devices.

Controller 400 may be one of one or more controllers of refuse vehicle 10, for example. Controller 400 generally receives and processes data from one or more image and/or object sensors disposed at various locations of refuse vehicle 10 to identify refuse cans located on at least the curb side of refuse vehicle 10. Controller 400 is shown to include a processing circuit 402 including a processor 404 and a memory 406. In some embodiments, processing circuit 402 is implemented via one or more graphics processing units (GPUs). Processor 404 can be implemented as a general purpose processor, an application specific integrated circuit (ASIC), one or more field programmable gate arrays (FPGAs), a group of processing components, or other suitable electronic processing components. In some embodiments, processor 404 is implemented as one or more graphics processing units (GPUs).

Memory 406 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 406 can be or include volatile memory or non-volatile memory. Memory 406 can include database components, object code components, script components, or any other type of information structure for supporting the various activities and information structures described in the present application. According to an example embodiment, memory 406 is communicably connected to processor 404 via processing circuit 402 and includes computer code for executing (e.g., by processing circuit 402 and/or processor 404) one or more processes described herein.

Processing circuit 402 can be communicably connected to a network interface 408 and an input/output (I/O) interface 410, such that processing circuit 402 and the various components thereof can send and receive data via interfaces 408 and 410. In some embodiments, controller 400 is communicably coupled with a network 440 via network interface 408, for transmitting and/or receiving data from/to network connected devices. Network 440 may be any type of network (e.g., intranet, Internet, VPN, a cellular network, a satellite network, etc.) that allows controller 400 to communicate with other remote systems. For example, controller 400 may communicate with a server (i.e., a computer, a cloud server, etc.) to send and receive information regarding operations of controller 400 and/or refuse vehicle 10.

Network interface 408 may include any type of wireless interface (e.g., antennas, transmitters, transceivers, etc.) for conducting data communications with network 440. In some embodiments, network interface 408 includes a cellular device configured to provide controller 400 with Internet access by connecting controller 400 to a cellular tower via a 2G network, a 3G network, an LTE network, etc. In some embodiments, network interface 408 includes other types of wireless interfaces such as Bluetooth, WiFi, Zigbee, etc.

In some embodiments, controller 400 may receive over-the-air (OTA) updates or other data from a remote system (e.g., a server, a computer, etc.) via network 440. The OTA updates may include software and firmware updates for controller 400, for example. Such OTA updates may improve the robustness and performance on controller 400. In some embodiments, the OTA updates may be receive periodically to keep controller 400 up-to-date.

In some embodiments, controller 400 is communicably coupled to any number of subsystems and devices of refuse vehicle 10 via I/O interface 410. I/O interface 410 may include wired or wireless interfaces (e.g., antennas, transmitters, transceivers, wire terminals, etc.) for conducting data communications with subsystems and/or devices of refuse vehicle 10. In some embodiments, I/O interface 410 may include a Controller Area Network (CAN) bus, a Local Interconnect Network (LIN) bus, a Media Oriented Systems Transport (MOST) bus, an SAE J1850 bus, an Inter-Integrated Circuit (I2C) bus, etc., or any other bus commonly used in the automotive industry. As shown, I/O interface 410 may transmit and/or receive data from a plurality of vehicle subsystems and devices including image/object sensors 430, a user interface 432, vehicle systems 434, and/or an actuator assembly 436.

As described herein, image/object sensors 430 may include any type of device that is configured to capture data associated with the detection of objects such as refuse cans. In this regard, image/object sensors 430 may include any type of image and/or object sensors, such as one or more visible light cameras, full-spectrum cameras, LIDAR cameras/sensors, radar sensors, infrared cameras, image sensors (e.g., charged-coupled device (CCD), complementary metal oxide semiconductor (CMOS) sensors, etc.), or any other type of suitable object sensor or imaging device. Data captured by image/object sensors 430 may include, for example, raw image data from one or more cameras (e.g., visible light cameras) and/or data from one or more sensors (e.g., LIDAR, radar, etc.) that may be used to detect objects.

Generally, image/object sensors 430 may be disposed at any number of locations throughout and/or around refuse vehicle 10 for capturing image and/or object data from any direction with respect to refuse vehicle 10. For example, image/object sensors 430 may include a plurality of visible light cameras and LIDAR cameras/sensors mounted on the forward and lateral sides of refuse truck 10 for capturing data as refuse truck 10 moves down a path (e.g., a roadway). In some embodiments, one or more of image/object sensors 430 may be located on an attachment utilized by refuse truck 10, such as container attachment 220 described above.

User interface 432 may be any electronic device that allows a user to interact with controller 400. Examples of user interfaces or devices include, but are not limited to, mobile phones, electronic tablets, laptops, desktop computers, workstations, and other types of electronic devices. In some embodiments, user interface 432 is a control system (i.e., a control panel) configured to display information to an operator of refuse vehicle 10 and/or receive user inputs. In this regard, user interface 432 may include at least a display for presenting information to a user and a user input device for receiving user inputs. In one example, user interface 432 includes a touchscreen display panel located in the cab 16 of refuse truck 10 and configured to present an operator with a variety of information regarding the operations of refuse truck 10. User interface 432 may further include a user input device, such as a keyboard, a joystick, buttons, etc.

Vehicle systems 434 may include any subsystem or device associated with refuse truck 10. Vehicle systems 434 may include, for example, powertrain components (e.g., engine 18), steering components, a grabber arm, lift assemblies, etc. Vehicle system 434 may also include electronic control modules, control units, and/or sensors associated with any systems, subsystems, and/or devices of refuse vehicle 10. For example, vehicle system 434 may include an engine control unit (ECU), a transmission control unit (TCU), a Powertrain Control Module (PCM), a Brake Control Module (BCM), a Central Control Module (CCM), a Central Timing Module (CTM), a General Electronic Module (GEM), a Body Control Module (BCM), an actuator or grabber assembly control module, etc. In this manner, any number of vehicle systems and devices may communicate with controller 400 via I/O interface 410.

Actuator assembly 436 may include at least the components of a lift assembly for engaging, lifting, and emptying a refuse can. Actuator assembly 436 can include, for example, any of the components of lift assembly 100 and/or lift assembly 200, described above with respect to FIGS. 1A and 1B. In general, actuator assembly 436 may include at least a grabber assembly (e.g., grabber assembly 42) configured to move to engage a refuse can. Actuator assembly 436 may include a plurality of actuators (e.g., linear actuators, lift actuators, horizontal actuators, etc.) for moving to engage the refuse can. As an example, actuator assembly 436 may be configured to move horizontally, vertically, orthogonally, etc., to refuse vehicle 10 in order to engage a refuse can. In some embodiments, actuator assembly 436 may further include an actuator assembly control module, configured to receive data and/or signals from controller 400 to initiate control actions for a grabber arm or actuator.

Still referring to FIG. 4, memory 406 is shown to include an object detector 420. Object detector 420 may generally receive and process data from image/object sensors 430 to detect objects (e.g., refuse cans). It will be appreciated that, has denoted herein, the data received and process by object detector 420 may include any type of data as described above with respect to image/object sensors 430, including video from which images and/or other image data can be extracted. As described above, the data may also include data from one or more sensors (e.g., LIDAR, radar, etc.) that may be utilized to detect an object (e.g., a refuse can) and/or a location or position of the object. As shown, for example, object detector 420 may receive data from image/object sensors 430 via I/O interface 410.

Object detector 420 may process the received data to detect target objects, including human beings and/or refuse cans. It will be appreciated, however, that object detector 420 may be configured to detect other objects based on other implementations of controller 400. In this regard, object detector 420 may provide means for controller 400 to detect and track a plurality of refuse cans on a path being traveled by refuse vehicle 10.

Object detector 420 may include a neural network or other similar model for processing received data (e.g., from image/object sensors 430) to detect target objects. As described herein, object detector 420 is generally a one-stage object detector (e.g., deep learning neural network), or may utilize a one-stage object detection method. Unlike two-stage object detectors (e.g., regional convolution neural network (R-CNN), Fast R-CNN, etc.), object detector 420 may process image data in a single stage and may provide advantages over many two-stage detectors such as increased speed (i.e., decreased computing time).

In a preferred embodiment, object detector 420 implements the architecture of RetinaNet. Details of RetinaNet, according to one implementation, can be found in Focal Loss for Dense Object Detection by Lin et. al., published in February 2018 and incorporated herein by reference in its entirety. In this regard, object detector 420 may also provide improvements over other one-stage object detectors, such as you-only-look-once (YOLO) and single shot detectors (SSDs). For example, object detector 420 may provide increased accuracy when compared to many one-stage object detectors, and even when compared to many two-stage detectors. Additionally, object detector 420 may scale better than many other one- and two-stage object detectors (e.g., SSD). The one-stage object detection methods of RetinaNet, as implemented by object detector 420, are described in detail below.

Figure 5:
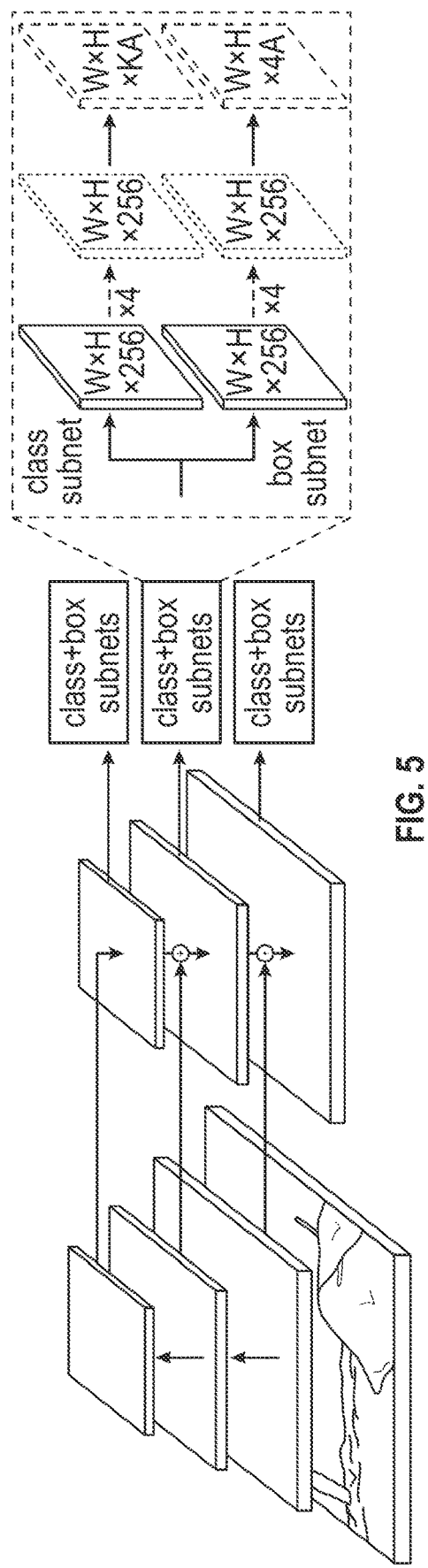
FIGS. 5 and 6 are example architectures for a model implemented by the controller of FIG. 5 for detecting refuse cans, according to some embodiments.
Figure 6:
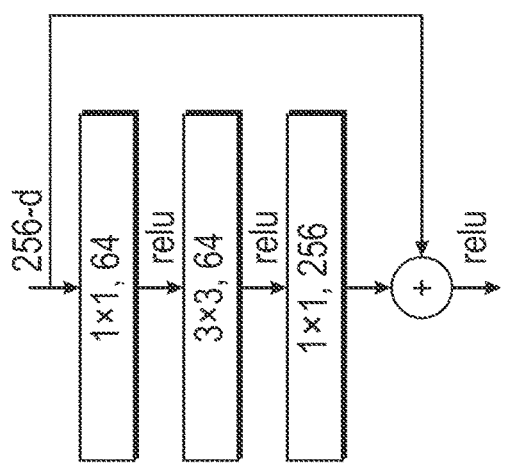

Referring now to FIGS. 5 and 6, examples of the architecture of object detector 420 are shown, according to some embodiments. Referring first to FIG. 5, the overall architecture of object detector 420 is shown. Object detector 420 generally includes a feature pyramid network (FPN) backbone and two task-specific subnetworks. Details of FPNs, according to one implementation, can be found in Feature Pyramid Network by Lin et. al., published in January 2017 and incorporated herein by reference in its entirety. Advantageously, FPN is multiscale, semantically strong at all scales, and quick.

The FPN is built on top of a residual neural network (ResNet) architecture. Details of ResNet, according to one implementation, can be found in Deep Residual Learning for Image Recognition by He et. al., published in December 2015 and incorporated herein by reference in its entirety. As shown in FIG. 6, ResNet utilizes a bottleneck architecture. For each residual function, ResNet uses three layers that are 1×1, 3×3, and 1×1 convolutions. The 1×1 layers act to decrease and subsequently increase dimensions of an input, while the 3×3 layer acts as a bottleneck.

Referring again to FIG. 5, at each FPN level, two fully convolutional networks (FCNs) are attached, including a classification subset and a box regression subnet. The classification and box regression subnets may be attached in parallel, as shown. The classification subnet predicts a probability of the presence of an object at a particular location, whereas the box regression subnet regresses the offset of each anchor box, described below, to a ground-truth object. The design of the classification subnet and the box regression subnet may be similar, where the two subnets have slightly different final convolutional layers. More specifically, final convolutional layer of the classification subnet may include KA filters, where K is the number of object classes (e.g., types of objects such as various types of refuse cans, people, cars, etc.) and A is the number of anchor boxes, and the box regression subnet may include 44 filters.

Figure 8:
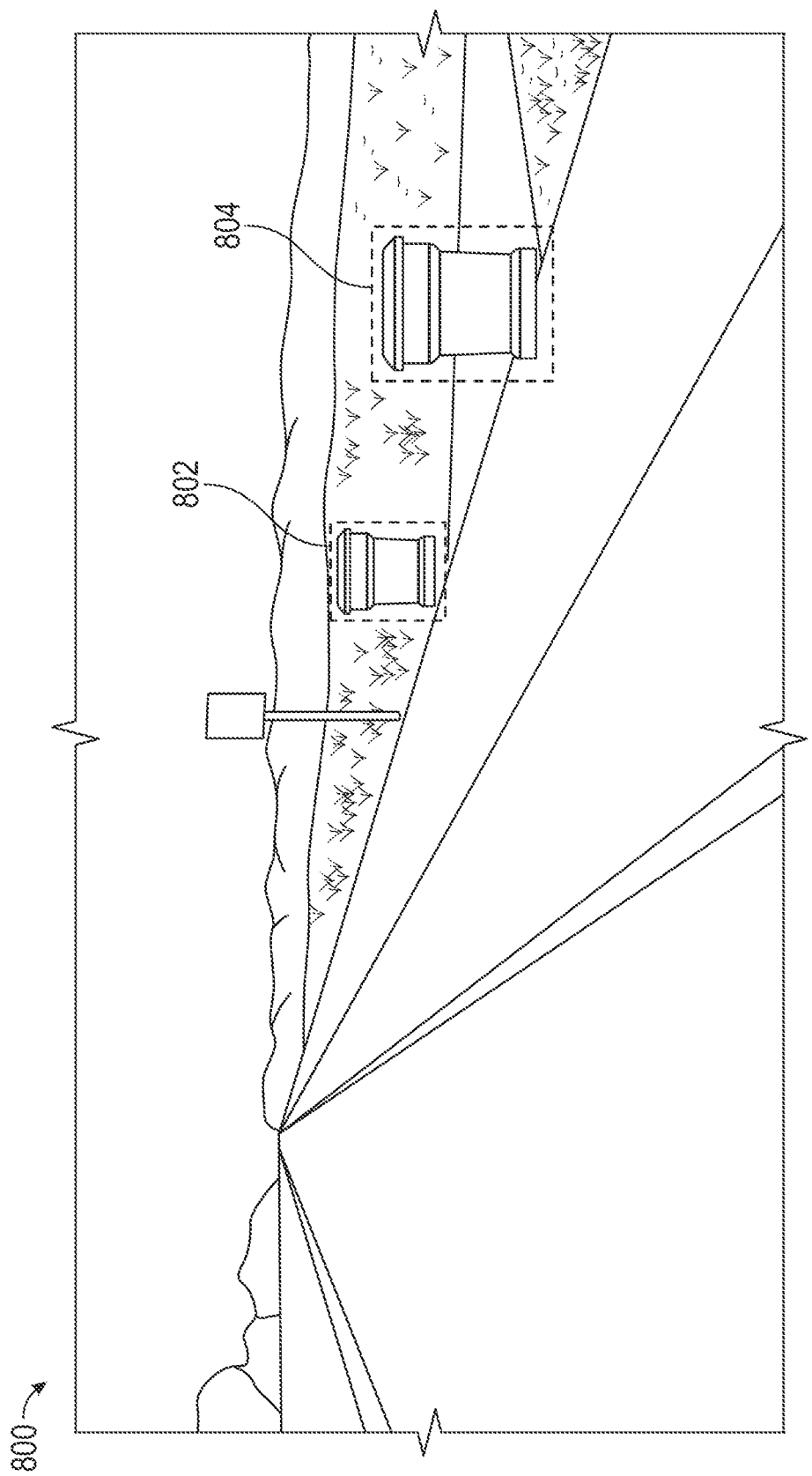
FIG. 8 is an example interface illustrating the detection of multiple refuse cans, according to some embodiments.

Anchor boxes, as mentioned above, define an area of an input image (e.g., input data) and detect an object from multiple (e.g., K) object classes in the area that the anchor box covers. For each anchor, a focal loss is applied during training of the object detector (e.g., object detector 420). The focal loss is a loss function designed to down-weight easily classified portions of an input image (e.g., the background). In this manner, the focal loss concentrates the network on difficult portions of the input image to increase the accuracy of the trained object detector (e.g., object detector 420), while also reducing the time required to train the object detector. For operations after training, the object detector selects a portion of anchor boxes with a confidence score (i.e., probability for each object class that an anchor box contains the object class) above a threshold value for generating bounding box predictions, as shown in FIG. 8.

In some embodiments, object detector 420 is post-processed (e.g., during training) by implementing automated augmentation and/or stochastic regularization to renormalize newer versions of object detector 420 that have been trained using new data. Automated augmentation may include, for example, automatically augmenting image data to produce slightly varied versions of the image data to retrain and improve object detector 420. Said post-processing techniques may improve the performance of object detector 420, for example, by reducing overfitting of object detector 420.

The model implemented by object detector 420 may be trained by any number of methods. For example, object detector 420 may be trained during manufacture or prior to implementation. In some embodiments, initial training of object detector 420 may be handled by a remote system (e.g., a server or computer), and a trained instance of object detector 420 may be implemented via controller 400. Similarly, object detector 420 may be updated or replaced by receiving updated object model data and/or a new version of object detector 420 via an over-the-air (OTA) update from a remote system via network 440. For example, a new version of object detector 420 may be trained on a remote server system and uploaded (i.e., transmitted) to controller 400 via network 440. In this manner, object detector 420 may be continuously improved to provide improved object detection.

Referring again to FIG. 4, memory 406 is shown to further include a user interface (UI manager) 422. UI manager 422 may generate a user interface based on data captured by image/object sensors 430 and/or detected object data from object detector 420. UI manager 422 may present a generated user interface via user interface 432, for example. The user interface may include data captured by image/object sensors 430 (e.g., live, delayed, or previously captured image data) and an indication of any detected objects within the data. As an example, the user interface may present an image of a path (e.g., roadway) that refuse truck 10 is traveling on, and may indicate one or more detected refuse cans located along the roadway. An example user interface is described in detail below, with respect to FIG. 8.

The user interface generated by UI manager 422 may provide means for a user (e.g., an operator of refuse vehicle 10) to interact with refuse vehicle 10 and/or actuator assembly 436 for semi-autonomous or non-autonomous operations. For example, a user interface that indicates two or more refuse cans may provide means for the user to select a particular one of the refuse cans to act on (e.g., to move to and engage). The user interface may also provide other information regarding the operations of refuse vehicle 10, such as alarms, warnings, and or notifications. In some embodiments, the user interface generated by UI manager 422 may include a notification when a human being is detected within a danger zone. This may alert an operator to an unsafe condition and/or may indicate to the operator why automated refuse can collection cannot be implemented (e.g., until no human beings are located in a danger zone).

Memory 406 is shown to further include a control module 424. Control module 424 determine and/or implement control actions based on detected objects (e.g., from object detector 420) and/or user inputs (e.g., from user interface 432). In some embodiments, control module 424 may implement any number of automated control actions based on detected objects such as refuse cans and/or human beings. In a first example, control module 424 may implement automated collection of a refuse can, based on detection of the refuse can. In this example, once a refuse can is detected, a location of the refuse can may be determined using any number of known methods. Based on the determined location of the target refuse can, control module 424 may determine a trajectory for refuse vehicle 10 and/or actuator assembly 436 in order to engage the refuse can.

In some embodiments, control module 424 may control (e.g., by transmitting control signals) vehicle systems 434 and/or actuator assembly 436 to move to and engage the refuse can. For example, control module 424 may transmit control signals to any number controllers associated with vehicle systems 434 (e.g., the ECU, the TCU, an automated steering system, etc.) in order to move refuse vehicle 10 to a desired position near a refuse can. In another example, control module 424 may transmit control signals to a controller associated with actuator assembly 436 in order to move/control actuator assembly 436.

In some embodiments, when a human being is detected within a danger zone (e.g., within a predefined zone and/or distance of refuse vehicle 10 and/or actuator assembly 436), control module 424 may initiate safety actions. The safety actions may include, for example, preventing refuse vehicle 10 and/or actuator assembly 436 from moving to and/or engaging the refuse can while the human being is detected within the danger zone. In some embodiments, control module 424 may initiate an alert/alarm/notification based on the detection of a human being in a danger zone, and may provide an indication of the alert to UI manager 422 for display via user interface 432.

Still referring to FIG. 4, memory 406 is shown to further include a feedback module 426. Feedback module 426 may receive data from image/object sensors 430 and/or one or more sensors associated with vehicle systems 434 and/or actuator assembly 436 to adjust and/or alter a trajectory (i.e., movement) of refuse vehicle 10 or actuator assembly 436. In some embodiments, feedback module 426 may process data (e.g., from image/object sensors 430 and/or object detector 420) to adjust and/or alter a trajectory (i.e., movement) of refuse vehicle 10 or actuator assembly 436. In some embodiments, feedback module 426 may include a model for processing feedback data. In some such embodiments, the model may be a recurrent neural network (RNN) or other suitable type of neural network for processing feedback data.

Figure 7:
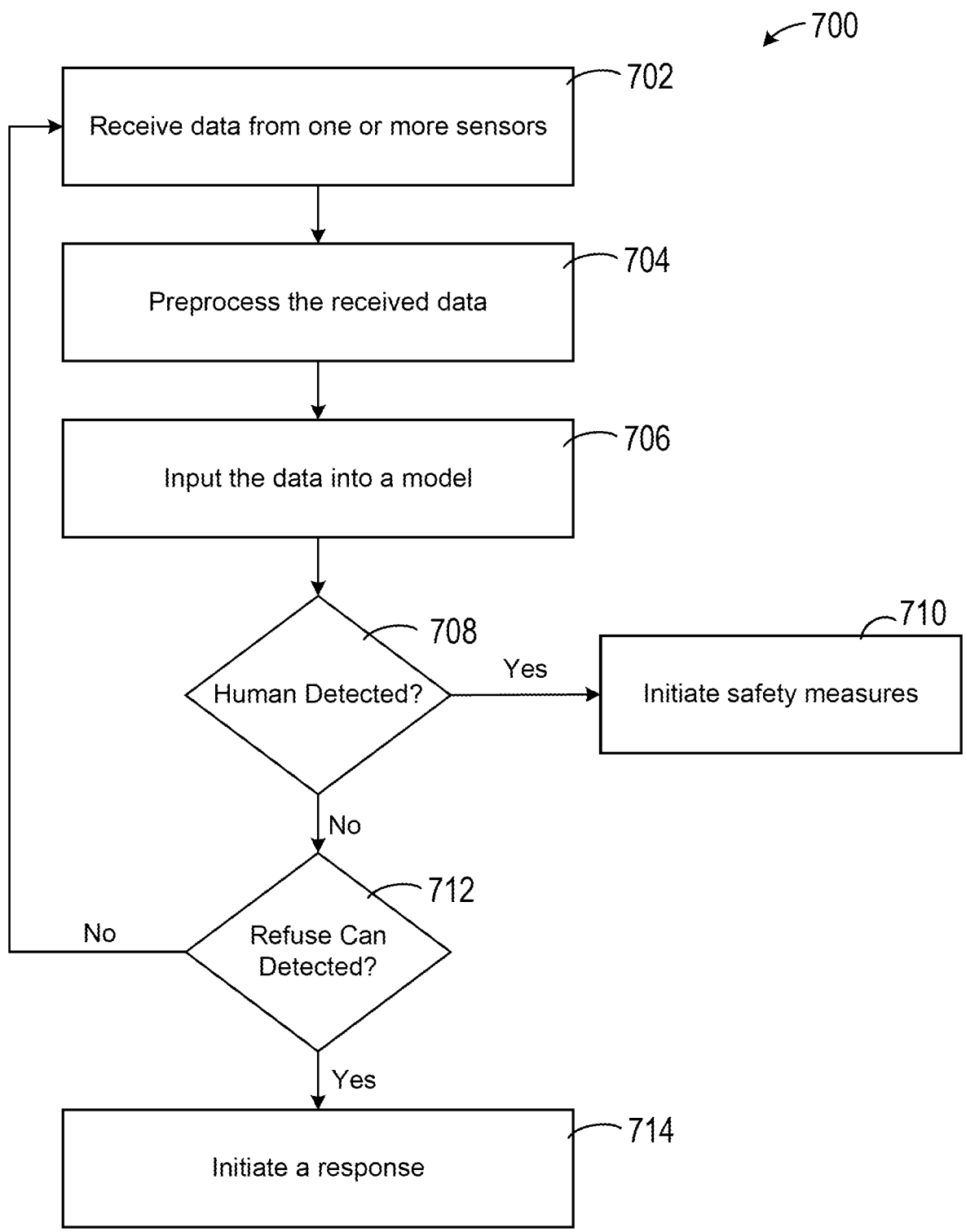
FIG. 7 is a process for detecting refuse cans, according to some embodiments.

Referring now to FIG. 7, a process 700 for detecting a refuse can from captured image and/or object data is shown, according to some embodiments. Process 700 may be a process implemented by a controller of a refuse vehicle (e.g., refuse vehicle 10) for detecting one or more refuse cans from data captured by object sensors disposed at various locations of the refuse vehicle. Process 700 may be implemented by controller 400, as described above, for example.

At step 702 data is received from one or more image and/or object sensors (e.g., image/object sensors 430) disposed at various locations of a refuse vehicle. In some embodiments, data is received from at least a visible light camera and a LIDAR camera or sensor. Received data may include raw data from one or more cameras (e.g., visible light cameras) and/or data from one or more sensors (e.g., LIDAR, radar, etc.), as described above. In various embodiments, the data includes still images, video, or other data that can be used to detect an object or objects. In some embodiments, the received data includes at least raw image data and LIDAR data. As described above with respect to FIG. 4, for example, data may be captured from one or more sides of a refuse vehicle, in order to detect refuse cans and/or other objects on either side of a roadway or path that the refuse vehicle traverses.

At step 704, the raw data received from the one or more sensors is preprocessed. It will be appreciated that step 704 may be an optional step in some implementations, where preprocessing is necessary or desired. In other implementations, it may not be necessary or desirable to preprocess the data. Accordingly, in some embodiments, preprocessing of data may be implemented prior to processing the data to detect objects such as refuse cans. In various embodiments, data may be preprocessed by an imaging device before being transmitted to a controller for image detection, or may be preprocessed by a first system (e.g., a controller, a computer, a server, a GPU, etc.) prior to being received by a second system (e.g., controller 400 and/or object detector 420) for object (e.g., refuse can) detection.

In some embodiments, preprocessing the data may include any number of functions based on a particular implementation. For example, preprocessing for a one-stage object detector such as object detector 420 may include determining and/or modifying the aspect ratio and/or scaling of received image data, determining or calculating the mean and/or standard deviation of the image data, normalizing the image data, reducing dimensionality (e.g., converting to grey-scale) of the image data, etc. In some embodiments, preprocessing may include determining and/or modifying the image data to ensure that the image data has appropriate object segmentation for utilizing during training (e.g., of object detector 420) and/or object detection. In some embodiments, preprocessing may include extracting or determining particular frames of video for further processing.

At step 706, the data is input into an object detector, such as object detector 420 as described above. The object detector may process the data to detect one or more target objects (e.g., refuse can and/or human beings). Generally, the object detector processes the data as described above with respect to FIGS. 5 and 6. In this manner, the data may be processed by a single-stage object detector (e.g., object detector 420), such as RetinaNet. The output of the object detector may be an indication of target objects, such as one or more refuse cans, and an indication of a confidence level for the detected objects. As an example, the indication of the target objects may include a class of the object (e.g., "refuse can", "person", etc.) and a confidence level that a bounding box (e.g., shown in FIG. 8) associated with the detected object actually contains the object.

At step 708, a determination is made based on the identification of human beings during object detection in the previous step. In some embodiments, the determination is made if a human being is detected within a predefined danger zone (e.g., an area of the image captured by the object sensors). The danger zone may indicate a region (e.g., in the proximity of refuse vehicle 10) where a person may be injured if automated refuse collection operations are initiated. If a human being is detected, process 700 continues to step 710. At step 710, safety measures may be initiated to prevent harm and/or injury to the person detected in the danger zone. The safety measures may include restricting movement of a refuse vehicle and/or an actuator assembly, such that the vehicle and/or the actuator assembly cannot move to engage a refuse can if a human being is detected within a danger zone. In some embodiments, the safety measures may include presenting an alarm (i.e., a notification) to an operator of the refuse vehicle (e.g., via user interface 432), to alert the operator to the detected human being.

If a human being is not detected, process 700 continues to step 712. At 712, a determination is made based on the whether or not a refuse can (e.g., or multiple refuse cans) are detected based on the data. In some embodiments, the determination is based on the confidence level associated with a detected object (e.g., associated with a bounding box for the detected object, as shown in FIG. 8). In some embodiments, a confidence level at or above a threshold value may indicated a determination that an object (e.g., a refuse can) is detected. A confidence level below the threshold value may indicate a determination that a refuse can is not detected. If no refuse can is detected, process 700 may continue back to step 702, where the process of capturing and processing data is repeated. If a refuse can is detected, however, process 700 may continue to step 714.

At step 714, a response is initiated based on the detection of a refuse can. The response may include any number of automated control actions. For example, the response may include presenting a notification or indication of the detected refuse can to an operator via a user interface (e.g., user interface 432). In this example, the operator may be provided with means for selecting one of one or more detected refuse cans to act on (e.g., to move to and engage). As another example, the control actions may include automatically moving the refuse vehicle and/or an actuator assembly to engage the refuse can. The control actions initiated at step 714 are described in detail below, with respect to FIG. 9.

Referring now to FIG. 8, an example interface 800 illustrating the detection of multiple refuse cans is shown, according to some embodiments. Interface 800 may illustrate an example of a user interface presented to a user of controller 400 and/or refuse vehicle 10. Interface 800 may be presented via user interface 432, for example. More generally, interface 800 illustrates the detection of refuse can objects from data captured by one or more image and/or object sensors. In some embodiments, interface 800 may be an example of an interface presented based on process 700.

In some embodiments, the image of interface 800 may represent an input image to object detector 420. Object detector 420 may be configured to detect any number of object classes, as described above, including at least refuse cans. As shown, a first refuse can 802 and a second refuse can 804 have been detected (e.g., by object detector 420). Each of refuse cans 802 and 804 are shown with a corresponding bounding box, indicating the object within interface 800 and a probability that the bounding box actually contains the detected object. The bounding boxes for each of refuse cans 802 and 804 may not only indicate detected objects, but may indicate a location of each of refuse cans 802 and 804 within a captured images (e.g., the image presented in interface 800.).

Each of refuse cans 802 and 804 are shown with a corresponding confidence value (e.g., 0.999 and 0.990, respectively). The confidence values may indicate a level of confidence that the associated bounding box actually contains an object (e.g., a refuse can). As described above, objects with a confidence value below a threshold may be ignored (e.g., not presented with a bounding box as shown). In some embodiments, an operator (e.g., of refuse vehicle 10) may select a refuse can to engage with (e.g., move to, pickup, and empty) from interface 800. For example, the user may select one of refuse cans 802 or 804 via a user input device (e.g., by touching a particular refuse can via a touchscreen).

Figure 9:
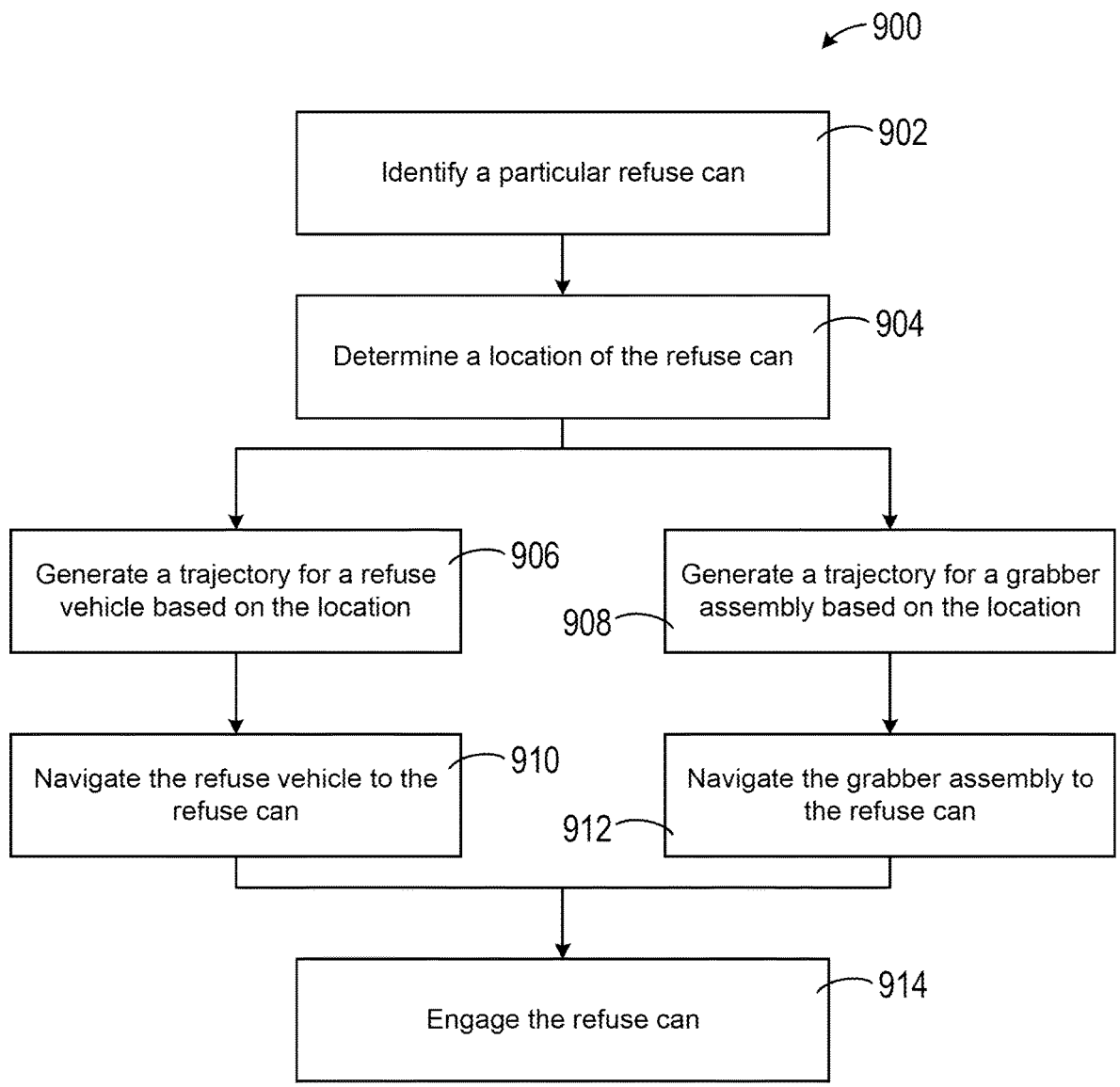
FIG. 9 is process for initiating control actions based on a detected refuse can, according to some embodiments.

Referring now to FIG. 9, a process 900 for initiating control actions based on a detected refuse can is shown, according to some embodiments. Process 900 may be implemented in response to detecting a refuse can, as described above with respect to process 500. Similar to process 500, process 900 may be implemented by a controller of a refuse vehicle (e.g., refuse vehicle 10), such as controller 400, described above. In various embodiments, process 900 is a continuation of process 500, or is performed subsequent to process 500. As denoted herein, an actuator assembly may refer to any type of grabber and/or lift assembly configured to engage and empty a refuse can into a refuse container of a refuse vehicle. For example, the actuator assembly may be lift assembly 100 or lift assembly 200, as described above.

At step 902, a particular refuse can is identified. As described above, multiple objects including multiple refuse cans may be detected. In order to initiate a control action, a particular refuse can may be identified, either automatically or based on a user input. In the first case, where a particular refuse can is automatically identified in order to initiate a control action, a controller (e.g., controller 400) may implement a number of parameters for identifying the particular refuse can. For example, the refuse can may be identified based on identifying features (e.g., size, color, shape, logos or markings, etc.) or may be selected based on its proximity to the refuse vehicle (e.g., the closest refuse can may be identified first). The particular refuse can may be automatically identified in autonomous operations (e.g., where refuse vehicle 10 is autonomous) in order to reduce or eliminate operator input.

In some embodiments (e.g., semi-autonomous or non-autonomous operations), the particular refuse can may be selected by an operator. As described above, for example, the operator may be presented with a user interface (e.g., interface 800) for viewing captured data (e.g., image data) and identified objects. The operator may select, from the user interface, the particular refuse can. Using interface 800 as an example, the operator may select one of refuse cans 802 or 804, in order to initiate collection of the particular refuse can.

At step 904, a location of the identified refuse can is determined. In some embodiments, the location of the refuse can may be determined based on the location of the refuse vehicle, such that the location of the refuse can is determined relative to the refuse vehicle. In some embodiments, sensor data from image/object sensors 430 may be used to determine the location of the detected refuse can. For example, data from LIDAR or radar sensors may be used to determine a location of the refuse can, and/or may be used to supplement other data (e.g., from a visible light camera).

At step 906, a trajectory is generated for the refuse vehicle based on the location of the refuse can. Simultaneously, at step 908, a trajectory is generated for an actuator assembly of the refuse vehicle. The trajectories for the refuse vehicle and actuator assembly may indicate a path that the corresponding systems follow to reach and engage the refuse can. The trajectory of the refuse vehicle, for example, may indicate a path or a set of movements for the refuse vehicle to follow to move next to the refuse can so that the actuator assembly may move to engage the refuse can. Similarly, the trajectory of the actuator assembly may indicate a path or a set of movements that the actuator assembly may follow to engage the refuse can once the refuse vehicle has moved alongside the refuse can.

At steps 910 and 912, the refuse vehicle and actuator assembly navigate (i.e., move) to the refuse can. In autonomous and/or semi-autonomous operations, the refuse vehicle (e.g., refuse vehicle 10) and actuator assembly (e.g., actuator assembly 436) may be controlled or commanded (e.g., by control module 424) to automatically navigate to the refuse can. For example, the refuse vehicle may automatically move to the refuse can, and the actuator may automatically move to engage the refuse can, without operator input. In other embodiments, the trajectories generated at steps 906 and 908 may be presented to the operator (e.g., via a user interface) so that the operator may navigate the refuse vehicle and/or the actuator to the refuse can. As an example, the trajectories may be presented via a user interface, indicating a path and/or movements that the operator should follow to navigate to the refuse can.

In some embodiments, as the refuse vehicle and/or the actuator assembly navigate (i.e., move) towards the refuse can, image data and/or sensor data may be capture from the various subsystems of the refuse vehicle (e.g., vehicle systems 434) and/or from the actuator assembly (e.g., actuator assembly 436). The captured image and/or sensor data may be transmitted to feedback module 426 in order to improve, modify, and/or otherwise adjust the movements of the refuse vehicle and/or actuator assembly. As described above, feedback module 426 may include a RNN for processing feedback data. As an example, feedback module 426 may interpret feedback data on the movement of the actuator assembly to adjust the trajectory of the actuator assembly as it moves to engage the refuse can.

At step 914, the refuse can is engaged by the actuator assembly. The refuse can may be engaged by moving the actuator assembly in any suitable direction to engage and lift the refuse can. For example, the actuator assembly may move horizontally, vertically, and or orthogonally to the refuse vehicle in order to engage the refuse can. Once the actuator assembly has secured the refuse can (e.g., by closing actuators), the actuator assembly may lift the refuse can to empty the contents of the refuse can into a refuse compartment (e.g., refuse compartment 30).

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "connected," and the like, as used herein, mean the joining of two members directly or indirectly to one another. Such joining may be stationary (e.g., permanent) or movable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the figures. It should be noted that the orientation of various elements may differ according to other exemplary embodiments, and that such variations are intended to be encompassed by the present disclosure.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products including machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

What is claimed is:

1. A system for detecting and engaging a refuse can, the system comprising:
   at least one sensor coupled to a refuse collection vehicle and configured to detect objects on one or more sides of the refuse collection vehicle;
   an actuator assembly coupled to the refuse collection vehicle and configured to actuate to engage the refuse can; and
   a controller configured to:
      receive first data from the at least one sensor, wherein the first data is received responsive to detection of an object;
      input the first data to a single-stage object detector;
      identify, based on an output of the single-stage object detector, the object as the refuse can, wherein the controller identifies the object as the refuse can responsive to a determination that the object is located in a predetermined bounding box;
      generate, responsive to identification of the object as the refuse can, a user interface to display at least a portion of the first data;
      provide, via the user interface, an element that indicates a location of the refuse can, the element added to the at least a portion of the first data such that the element:
         surrounds the refuse can within the at least a portion of the first data; and
         continues to surround the refuse can responsive to at least one movement of the actuator assembly or at least one movement of the refuse collection vehicle;
      determine a trajectory for the actuator assembly that includes at least one of (i) a path for the actuator assembly to take or (ii) one or more movements for the actuator assembly to execute to engage the refuse can;
      update, responsive to determination of the trajectory, the user interface to include a graphical representation of the trajectory such that at least one of (i) the path or (ii) the one or more movements is presented via the user interface;
      update the graphical representation of the trajectory responsive to a change in a position between the refuse collection vehicle and the refuse can; and
      adjust, during performance of at least a portion of the trajectory by the actuator assembly, a position of the element within the at least a portion of the first data such that the element continues to surround the refuse can to indicate the location of the refuse can.

2. The system of claim 1, the at least one sensor comprising at least one of a visible light camera, a LIDAR camera, and a radar sensor.

3. The system of claim 1, wherein the single-stage object detector is configured to output an indication of a class for one or more detected objects.

4. The system of claim 1, wherein the output of the single-stage object detector is a probability of a presence of the refuse can, wherein identification of the object as the refuse can is based on a determination that the probability of the presence of the refuse can is above a threshold.

5. The system of claim 1, the single-stage object detector comprising a feature pyramid network (FPN).

6. The system of claim 1, the controller further configured to:
   determine a second location of the refuse can; and
   generate a trajectory to the second location of the refuse can for at least one of the refuse collection vehicle or the actuator assembly coupled to the refuse collection vehicle.

7. The system of claim 1, wherein the first data is image data, the controller further configured to train the single-stage object detector using augmented versions of the image data.

8. The system of claim 1, the controller further configured to:
   identify a person based on the output of the single-stage object detector;
   determine whether the person is within a predefined danger zone based on a proximity of the person to the refuse collection vehicle; and
   initiate one or more safety measures if the person is determined to be within the predefined danger zone.

9. The system of claim 8, wherein the one or more safety measures comprise at least one of limiting movement of the refuse collection vehicle or the actuator assembly and displaying an alert on the user interface, wherein the user interface is displayed within a cab of the refuse collection vehicle.

10. The system of claim 1, wherein the controller is further configured to update the user interface to display:
    the predetermined bounding box within the at least a portion of the first data; and
    an indication of a confidence score that the object is located within the predetermined bounding box.

11. The system of claim 1, wherein the controller is further configured to:
    determine a second trajectory for the refuse collection vehicle to reach the refuse can; and
    update the user interface to include a graphical representation of the second trajectory.

12. The system of claim 1, wherein the refuse can is a first refuse can, wherein the controller is further configured to:
- identify, based on the output of the single-stage object detector, a second refuse can;
- receive, responsive to generation of the user interface, a selection of the first refuse can from within the user interface; and
- responsive to the selection of the first refuse can, provide the element that:
  - surrounds the first refuse can within the at least a portion of the first data; and
  - continues to surround the refuse can responsive to at least one movement of the actuator assembly or at least one movement of the refuse collection vehicle.

13. A method for detecting a refuse can, the method comprising:
- receiving data from one or more sensors coupled to a refuse collection vehicle, wherein the data is received responsive to detection of an object;
- processing the data by inputting the data into a single-stage object detector;
- identifying the object as the refuse can based on an output of the single-stage object detector, wherein identifying the object as the refuse can based on the output of the single-stage object detector includes determining that the object is located in a predetermined bounding box;
- generating, responsive to identifying the object as the refuse can, a user interface to display at least a portion of the data;
- providing, via the user interface, an element that indicates a location of the refuse can, the element added to the at least a portion of the data such that the element:
  - surrounds the refuse can within the at least a portion of the data; and
  - continues to surround the refuse can responsive to at least one movement of the refuse collection vehicle;
- determining a trajectory for an actuator assembly of the refuse collection vehicle, wherein the trajectory includes (i) a path or (ii) one or more movements for the actuator assembly to engage the refuse can;
- updating, responsive to determining the trajectory, the user interface to include a graphical representation of the trajectory such that (i) the path or (ii) the one or more movements is presented via the user interface;
- updating the graphical representation of the trajectory responsive to a change in a position between the refuse collection vehicle and the refuse can; and
- adjusting, during performance of at least a portion of the trajectory by the actuator assembly, a position of the element within the at least a portion of the data such that the element continues to surround the refuse can to indicate the location of the refuse can.

14. The method of claim 13, wherein the single-stage object detector is configured to output an indication of a class for one or more detected objects.

15. The method of claim 13, wherein the output of the single-stage object detector is a probability of a presence of the refuse can, wherein identification of the object as the refuse can is based on a determination that the probability of the presence of the refuse can is above a threshold.

16. The method of claim 13, the single-stage object detector comprising a feature pyramid network (FPN).

17. The method of claim 13, wherein the data is image data, the method further comprising training the single-stage object detector using augmented versions of the image data.

18. The method of claim 13, further comprising:
- identifying a person based on the output of the single-stage object detector;
- determining whether the person is within a predefined danger zone based on a proximity of the person to the refuse collection vehicle; and
- initiating one or more safety measures if the person is determined to be within the predefined danger zone.

19. The method of claim 18, wherein the one or more safety measures comprise at least one of limiting movement of the refuse collection vehicle or the actuator assembly and displaying an alert on the user interface, wherein the user interface is displayed within a cab of the refuse collection vehicle.

20. A controller for a refuse collection vehicle, the controller comprising:
- one or more memory devices having instructions stored thereon that, when executed by one or more processors, cause the one or more processors to perform operations comprising:
  - receiving data from one or more image sensors coupled to an exterior of the refuse collection vehicle, wherein the data is received responsive to detection of an object;
  - processing the data via a single-stage object detector to identify the object as a refuse can, wherein an output of the single-stage object detector is a determination that the object is located in a predetermined bounding box;
  - generating, responsive to identifying the object as the refuse can, a user interface to display at least a portion of the data;
  - providing, via the user interface, an element that indicates a location of the refuse can, the element added to the at least a portion of the data such that the element:
    - surrounds the refuse can within the at least a portion of the data; and
    - continues to surround the refuse can responsive to at least one movement of the refuse collection vehicle;
  - determining a trajectory for an actuator assembly of the refuse collection vehicle, wherein the trajectory includes (i) a path or (ii) one or more movements for the actuator assembly to engage the refuse can;
  - updating, responsive to determining the trajectory, the user interface to include a graphical representation of the trajectory such that (i) the path or (ii) the one or more movements is presented via the user interface;
  - updating the graphical representation of the trajectory responsive to a change in a position between the refuse collection vehicle and the refuse can; and
  - adjusting, during performance of at least a portion of the trajectory by the actuator assembly, a position of the element within the at least a portion of the data such that the element continues to surround the refuse can to indicate the location of the refuse can.

21. The controller of claim 20, the one or more image sensors comprising at least one of a visible light camera, a LIDAR camera, and a radar sensor.

22. The controller of claim 20, wherein the single-stage object detector comprises a feature pyramid network (FPN) configured to output an indication of a class for one or more detected objects.

* * * * *